INVENTOR
ARNOLD A. DEDOES,

ATTORNEY

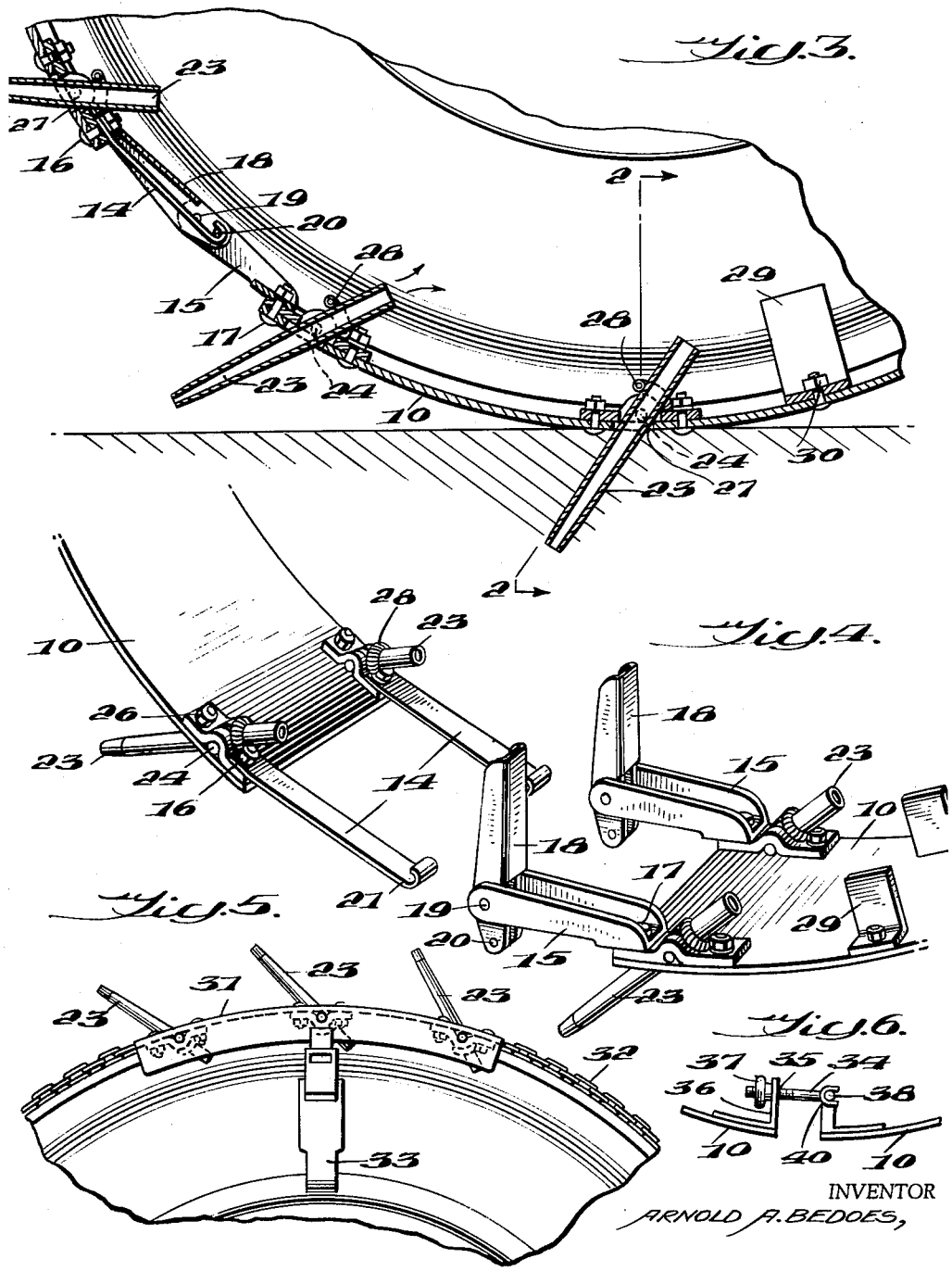

United States Patent Office 3,221,822
Patented Dec. 7, 1965

3,221,822
SOIL PENETRATING IMPLEMENT
Arnold A. Dedoes, 2070 W. Eight Mile Road, Berkley, Mich.
Filed Dec. 20, 1963, Ser. No. 332,040
4 Claims. (Cl. 172—22)

This invention relates to soil working devices and more particularly to a soil aerating device adapted for attachment to farm tractor wheels and the like now is present day use.

Soil aerating tractor devices having wheels carrying pivotally mounted peripherally deposed coring elements adapted to penetrate the ground and in some cases remove a plug of earth so that soil may be treated in any desired manner have heretofore been employed. For example, after the holes are made or cored out in the earth, a fertilizer may be applied to the soil, it may be watered in the usual manner or grass plugs of a well known kind may be inserted in the holes to assist in the maintenance of an improved lawn or a golf course green and the like. This general use of such coring tools for aerating soil on large tracts of land is well known and heretofore the operation has been carried out by special large and expensive tractor equipment and this type of equipment is not adaptable for home use where areas are small and space for maneuvering is limited.

Farm tractors of all sizes and types, especially the small garden variety of tractor, are usually provided with relatively large diameter rubber tires of various kinds and specially designed treads to enable the tractor to have good ground engaging contact and thus enable it to perform the desired task of pulling or operating various kinds of implements associated therewith.

An important object of the present invention is to provide a demountable soil engaging and aerating attachment for a tractor wheel which shall be readily attached to and quickly removed from the ordinary tractor wheel without altering the wheel construction or interfering in any way with the ordinary use of such implements as plows, cultivators or grass mowers or the like which frequently form an integral part of the tractor in its normal use.

Another important object of the present invention is to increase the utility of the present day rubber tired farm tractor by providing a soil working wheel attachment which shall perform the specific function of a soil aerator implement without in any way altering the tractor wheel construction.

Another object of the invention is to provide an attachment of the character designated which shall be in the form of a quick detachable metal rim for use with the rubber tired wheel of the tractor and provided with circumferentially spaced apart and outwardly extending soil penetrating elements pivotally mounted exteriorly on the rim body.

Another object of the invention is to provide a novel flat metal circumferentially disposed band for carrying projecting soil penetrating elements and tire gripping members for holding the band firmly on the tractor wheel tire tread.

Another object of the invention is to provide an attachment tool of the character designated which shall include an arcuate shaped segmental aerating device constructed and arranged to facilitate packaging and marketing the device.

Another object of the invention is to provide a novel clamp device for securing the adjacent ends of the rim parts together as well as provide a radial guide for securing the rim unit segments to the tractor wheel.

A further object of the invention is to provide an attachment for a garden type tractor wheel of the type adapted for special use on lawns, golf greens and the like which shall perform the function of a soil aerator at a minimum cost without interfering with or in any way necessitate the changing of the tractor structure.

A still further object of the invention is to provide a flat metal rim and soil aerator attachment which may be mounted on the circumferential tread of a rubber tire of an agricultural tractor in a minimum of time and without the aid of special tools to convert a tractor wheel into a soil aerator.

These and other objects of the invention will be more manifest from the following specification and drawings and more specifically set forth in the claims.

In the drawings:

FIGURE 3 is an enlarged fragmentary view partially in section of the soil penetrating elements and one form of clamp for securing the meeting ends of the rim segments;

FIGURE 4 is a perspective view of the segmental rim clamp shown in FIGURE 3, in open position;

FIGURE 5 is a modification showing a individual arcuate form of aerator implement and holding device; and FIGURE 6 is a view partially in section of a modification of the adjustable clamp for tightening the rim parts.

Figure 1:
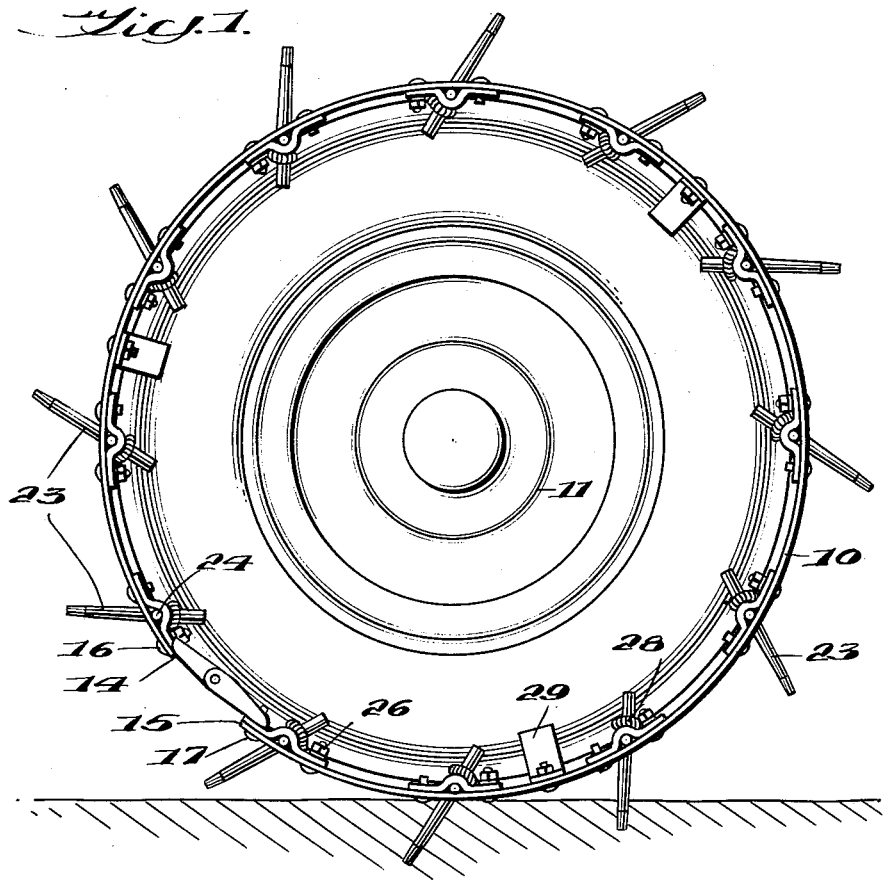
FIGURE 1 is a view in elevation of a demountable rim embodying the invention.
Figure 2:
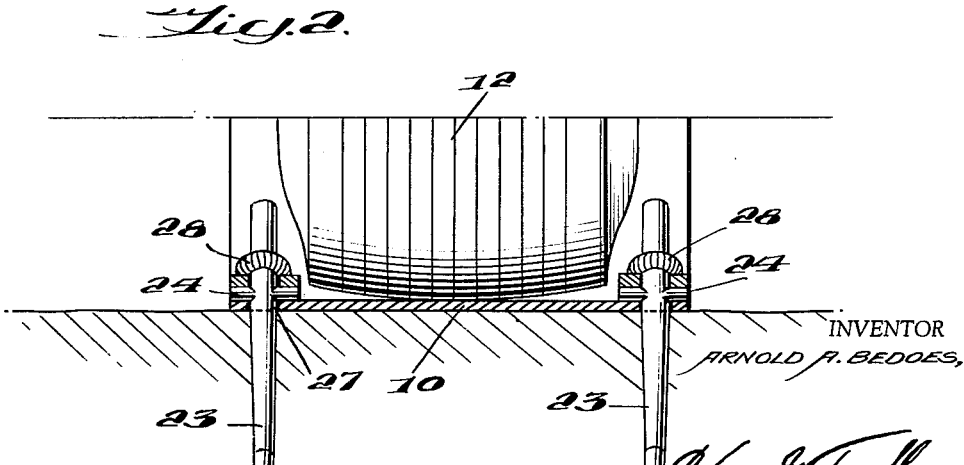
FIGURE 2 is a fragmentary front view partially in section of a rim segment and tire.

Referring to FIGURES 1 and 2 of the drawings there is shown at 10 a flat annular metal rim band constructed and arranged in accordance with the present invention. The rim 10 is preferably a broad heavy sheet metal band of a width greater than a tractor wheel 11 and its rubber tire 12. The band is of a surface thickness which shall not affect or materially change the diameter of the wheel to which it may be attached. This rim 10 is designed to be of a diameter substantially the same size as the outer circumference as the tractor wheel so that a tight circumferential fit shall be obtained. If the rim is divided as indicated by the numeral 13, the meeting end parts include a cooperating pair of adjustable clamp members 14 and 15 secured to the respective adjacent ends of the rim in any suitable manner such as bolts or rivets indicated by the numerals 16–17. This arrangement facilitates mounting and demounting the rim 10 on its associated wheel, as well as to take care of any variations in the diameter of the tractor tire and at the same time draw the rim 10 tightly thereon as a comparatively rigid and integral operating unit.

The clamp members 14 and 15 are drawn together by an appropriate channel shaped metal hand lever member 18 pivotally mounted on member 15, as shown in FIGURES 3 and 4 and which is also channel shaped and having a pivot member 19 connecting the channel side. The outer extremity of the channel shaped channel member 18 includes a connecting pivot member 20 for holding the lever in engagement with a hook shaped end portion 21 on the extremity of member 14. It will be noted in FIGURE 2 that the pivot pin 20 is slightly higher than the pin 19 when the parts are cammed together to form a streamlined symmetrical connection and also minimize the collection of dirt.

This pivotal connection is of the usual snap-over connection and may be substituted by the threaded T-bolt and nut connection shown in FIGURES 5 and 6, hereinafter more specifically described. Whichever form of clamp is employed, each clamp unit is positioned on the rim 10 at the lateral edges thereof. For example, in FIGURE 2, holes 22 are provided in the end portion of the rim 10 for the clamp member 14 while in FIGURE 5 the threaded portion of the bolt takes care of an adjustment which may be necessary. Whichever form is employed, the clamp members are located so as to be accessible beyond the sides of the rubber 12 as shown in FIGURE 2 so as to be accessible to adjust the rim 10 circumference to fit any tractor size for which the device is intended to be used.

To further aid in retaining the rim 10 on the tractor wheel tire, inwardly projecting guide or cleat plate members 29 are secured to the inner side of the rim 10, in any suitable manner by bolts 30, or welding if desired.

On the outside peripheral surface of the novel rim band 10 are located a plurality of outwardly extending and slightly tapered tubular steel soil engaging members 23—23. The ground piercing side wall ends of the tubular members are preferably sharpened so as to facilitate entry into the soil being worked or cut core holes in sod in the case of preparing a lawn. The upper end portions of the members 23 are provided with integral side extensions 24—24, which form pivotal bearing supports for retention in a bearing member 25.

These bearing members are mounted on the rim edge by suitable bolts 26 or they may be welded if desired. It will be noted that each of these tubular soil engaging members project through an elongated slot opening 27 formed in the rim edge and mounted so as to pivotally swing in the slotted opening at approximately 30° angle to the rim surface 10 and thus allow for proper vertical penetration into the soil when the tractor wheel is rotating. This arrangement also provides proper withdrawal of the member to prevent ragged or uneven disturbance of the soil. This operation is especially desirable in working grass sod and in order to control the position of the members 23—23 in penetrating the ground, a suitable spring 28, such as a coil spring having its ends secured to the bearing retaining bolts 26.

While I have shown and described the mechanism for holding one soil penetrating member 23 all the others on the periphery of rim 10, they are all secured and operated in the same manner. It will be noted that these soil members are preferably located in pairs on the plate rim 10 near the edge thereof. This arrangement provides for maximum usage of the rim to effect the desired results in treating the soil.

In some cases a single arcuate shaped plate rim element in the form of a segment 31 may be employed and this segment member is adapted to carry the same type of soil penetrating members 23—23. In this arrangement, the segment member 31 is secured circumferentially by a band member indicated by a chain 32 or other flexible circumferential element. The segmental plate 31 is further held against lateral displacement by a suitable flexible strap element 33 engaging the felly of the tractor wheel 11 and the opposite sides of the plate segment 31. One end of the strap element 33 may be permanently connected to one side edge of the segment element 31 and the other end secured by an adjustable T-bolt construction having a connection with the opposite side of the segment plate or depending side edges if desired. As heretofore stated, this construction includes a T-bolt having a threaded bolt section 34 projecting through an opening 35 in a rim cleat 36, and engaged by a wing nut 37. The other end of the bolt 34 includes a T-head 38 adapted to engage and hold the head in a socket member 40 mounted on the rim edge of the segment 31 as indicated in FIGURE 6.

While I have shown the novel form of rim carrying tubular soil aerating tools which remove plugs of earth, it is obvious that any other implements may be attached to the rim for performing different soil operations by small tractors and these tools may include cutters, rotatilling devices and spikes and the like for working soil.

When it is desired to utilize the tractor as a soil aerating implement, the rim attachment 10 is conveniently applied to the tractor wheel tire as heretofore described and thus immediately converting the tractor to a soil working implement without altering the tractor or wheels in any way and without the use of any special tools, so that the change-over may be accomplished in a minimum of time and in an inexpensive manner.

The detachable soil penetrating detachable rim may be an integral unit or it may be circumferentially divided into separate appropriate arcuate sections and each assembled to the tractor wheel tire by cross strap clamps as shown in FIGURES 5 and 6. One of the features of the arcuate sections is that they may be readily nested and packaged for ready transportation and storage. It frequently happens that the small garden tractor operator, for example, does not have the storage facilities and the conveniences of a package article is of considerable importance to him from an economical standpoint.

Another important feature of the novel demountable soil aerator attachment is the flexible commercial utility of the implement. The band 10 may be attached to one or both driving wheels of the tractor depending upon the kind of work to be accomplished. Furthermore, if only a small amount of perforation is desired, the single arcuate penetractor may be employed. All of the changes and adaptations may be accomplished in minutes of time with a minimum of delay which results in reducing labor costs to a minimum.

Furthermore, the device is particularly useful in treating golf course greens for example, wherein different kinds of grasses are encountered and many times in the interest of economy, the grass may be cut and sod areated simultaneously. In other words, the aerator may be used in conjunction with any form of agricultural implement whether it be a grass mowing machine or any other form of agricultural implement.

Having thus described a demountable aerator constructed and arranged in accordance with the present invention, it will be obvious that various changes may be made therein without departing from the invention as set forth in the following claims.

What is claimed is:

1. A demountable soil aerating rim attachment for use on a rubber tired tractor wheel comprising a flat metal surfaced annular band, said band having a circumference substantially fitting the circumference of the rubber tire on said tractor wheel, said flat metal annular band having a plurality of elongated slot means formed in the surface thereof and spaced laterally from the side edges of the tire, a plurality of elongated tubular soil coring elements extending through said slot means and mounted for pivotal movement on the inside surface edges of said band so as to discharge cored material to one side of said tire, and means for removably securing the metal band to the tractor wheel.

2. A soil aerator of the character described in claim 1 in which the soil coring elements are tapered longitudinally in form and spaced around the peripheral edge of the band, elongated slot means formed in the peripheral surface of said band and spaced laterally from the side edges of the tire, and means for pivotally mounting said tubular soil penetrating members in said slots so as to project vertically therefrom.

3. A detachable soil penetrating attachment for a tractor wheel rubber tire having a grooved rubber tread comprising an arcuate base member, a plurality of spaced apart tubular soil penetrating members pivotally mounted on said base member, elongated slots formed in said base member to receive said tubular soil penetrating members and space the members laterally from the side edges of said tire, and means connecting the opposite ends of said arcuate base member and cooperating with the tire for securing the base member to the tractor wheel.

4. As a new article of manufacture, a demountable soil aerating implement for a rubber tired tractor wheel, said implement comprising a broad sheet metal supporting base adapted to conform to the circumferential tread of the tractor tire, means for pivotally mounting a plurality of spaced apart tubular soil coring elements on the inside surface of said base, said coring elements extending through corresponding elongated openings formed in the surface of said base near the opposite lateral edges of said base and to one side of said tire for freely passing cored material outwardly therefrom, and means for attaching said implement metal base to the circumference of said tractor tire.

References Cited by the Examiner

UNITED STATES PATENTS

| | | | |
|---|---|---|---|
| 57,105 | 8/1866 | Emerson | 172—545 |
| 1,191,185 | 7/1916 | Hull | 172—545 |
| 1,427,813 | 9/1922 | Holt | 152—56 |
| 1,866,998 | 7/1932 | Buel | 172—21 |
| 2,207,451 | 7/1940 | Betzell | 152—56 |
| 2,353,916 | 7/1944 | Mickelson | 152—56 |
| 2,441,471 | 5/1948 | Chausse | 152—56 |
| 2,587,406 | 2/1952 | Talbert | 172—71 |
| 2,700,926 | 2/1955 | Goit | 172—22 |

FOREIGN PATENTS 258,112　9/1926　Great Britain.

ABRAHAM G. STONE, *Primary Examiner.*